United States Patent [19]

De Fatis

[11] Patent Number: 4,649,166
[45] Date of Patent: Mar. 10, 1987

[54] PAVING COMPOSITION CONSISTING ESSENTIALLY OF CLAY AND AN ACRYLIC LATEX EMULSION

[76] Inventor: Stefano T. De Fatis, Viale dei Primati Sportivi, 27, 00144 Roma, Italy

[21] Appl. No.: 661,578

[22] Filed: Oct. 16, 1984

[51] Int. Cl.$^4$ ............................. C08L 1/00; C08K 3/34
[52] U.S. Cl. ............................................ 524/35; 524/2; 524/5; 524/8; 524/60; 524/446
[58] Field of Search .................. 524/2, 5, 8, 35, 60, 524/446

[56] References Cited

U.S. PATENT DOCUMENTS

| | | | |
|---|---|---|---|
| 3,879,909 | 4/1975 | Lamoria et al. | 524/5 |
| 4,043,827 | 8/1977 | Bernett | 524/5 |
| 4,316,826 | 2/1982 | Laquerbe et al. | 524/2 |
| 4,374,203 | 2/1983 | Thompson | 106/288 B |

FOREIGN PATENT DOCUMENTS

| | | | |
|---|---|---|---|
| 0069433 | 6/1977 | Japan | 524/5 |
| 2083015 | 3/1982 | United Kingdom | 524/5 |
| 1004304 | 3/1983 | U.S.S.R. | 524/8 |

OTHER PUBLICATIONS

Derwent Abstract 16191 K/07 (J58002375)Konishi KK Jan. 1983.
Derwent Abstract 41644 B/22 (J54051222) Dantani Print Plate Co. (Apr. 1979).

Primary Examiner—Herbert J. Lilling
Attorney, Agent, or Firm—Brooks Haidt Haffner & Delahunty

[57] ABSTRACT

A mortar for waterproof and protective coverings to be employed for building and road construction. The mortar comprises a mixture of an acrylic emulsion and finely ground clay which has been baked at a temperature range between 600° C. and 1400° C.

7 Claims, No Drawings

PAVING COMPOSITION CONSISTING ESSENTIALLY OF CLAY AND AN ACRYLIC LATEX EMULSION

This invention refers to a mortar for waterproof and protective coverings obtained by mixing a substance in emulsion which is adapted to coagulate and is extremely resilient with an inert substance having a fine grain such as a clay obtained by a process of baking and grinding.

A range of different products can be obtained by using different combinations of the above mentioned materials. These products can also have antithetic features with respect to each other and they can be widely used in various fields of building.

As it will be apparent from the following description by means of examples, both the proportions of the materials and the manufacturing processes can vary to a large extent.

The emulsion will be generally referred to as "latex", except in particular examples.

The latex can be made from acrylic or acrylonitrilic rubbers, polyacetovinylic resins, butadienic rubbers, synthetic and natural rubbers, vinyl-acrylic copolymers and the like. In the vinyl and acrylic copolymers, the single radical can be linked to an inert group which does not interfere with polymerization.

The clays, which can be fat, lean, additioned, refractory, meltable or calcareous clays and the like are subjected to baking at temperatures ranging from 600° C. to 1,400° C., grinding and possibly to chemical treatments using dealkalinizing, fluorinizing and phosphating agents.

It has been proved in the practice that additives acting as antifoaming, sediment-preventing and plasticizing agents should be added to these products in order to improve some characteristics thereof.

These additives are added in quantities ranging from 0.2% and about 3% and preferably about 1% of antifoaming agent, about 0.5% of cellulose, used as a sediment-preventing agent, and about 0.5% of a plasticizing agent used as a polimerization accelerator, all these percentages being referred to the latex weight.

In this invention the cellulose, which has the double aim of increasing the softness of the products and preventing the formation of sediments during storage and transport of the products, is used at a viscosity of 15,000 CPS.

Additives of other types, such as cements intended to increase the hardness of the products or bituminous substances aiming at improving the water-proofness thereof, can be added to these substances which are always present.

It is an object of the invention to provide products having different characteristics according to the various applications thereof.

For example, it is possible to obtain either products that owing to the permeability characteristics thereof can be used as permeable mortars and for the flooring of sports facilities, or products suitable to be used as waterproof and protective products in the form of a paste, special mortars for industrial pavings (of the fire-proof, acid-proof type, having high electric resistivity, sound-deadening and the like), special mortars for the flooring of sports facilities (tracks, gymnasiums, tennis courts), road pavings, paints and special treatments for building, especially for the treatment of brick tile floors.

One of the main advantages of the application of the products of the invention is that these products can be provided ready to use for most of the applications thereof, thus saving time and work.

A further advantage is that the product of the invention has a natural red color similar to that of baked clays. Accordingly, this product does not require the addition of costly dyeing substances when it is used as a flooring for sports tracks and tennis courts, a plaster for buildings, a flooring for terraces and the like.

Furthermore, different latexes can be mixed in order to obtain products having particular characteristics. For example, an acrylic resin can be mixed to a vinyl-acrylic copolymer.

Examples will be now described showing some combinations of the above-mentioned substances together with the products which can be obtained therefrom and the process for obtaining these products and, in some cases, the most characteristic use thereof. It should be noted that the percentages of the materials are referred to the total body of the mortar.

EXAMPLE 1

A product used as a waterproof mortar for terraces, solar pavements and the like.

The following components were used:
- about 78.5% of an inert substance (a medium clay having a grain 00);
- about 21% of latex of a synthetic rubber in emulsion;
- about 0.2% of an antifoaming agent;
- about 0.1% of cellulose; and,
- about 0.1% of a plasticizing agent.

The clay was baked at about 800° C., subjected to grinding and then dealkalinized.

The combination was obtained by simple mixing.

EXAMPLE 2

A product suitable to be used as a waterproof mortar. The following components were used:
- about 77% of an inert substance (a medium clay having a grain 0);
- about 15% of latex of a synthetic rubber;
- about 7% of a vinyl-acrylic copolymer in suspension;
- about 0.2% of an antifoaming agent;
- about 0.1% of cellulose; and,
- about 0.1% of a plasticizing agent.

The clay was baked at about 800° C. and then ground.

If necessary, a double percentage of a bituminous emulsion can be possibly added for each percentage of the copolymer.

The process was the same as for example 1.

EXAMPLE 3

A product suitable to be used as a resilient flooring for gymnasiums.

The following components were used:
- about 77% of an inert substance (a medium clay having a grain 1);
- about 15% of latex of acrylonitrilic or acrylic resins;
- about 7% of a vinyl-acrylic copolymer in emulsion;
- about 0.2% of an antifoaming agent;
- about 0.1% of cellulose; and,
- about 0.1% of a plasticizing agent.

The clay was baked at about 800° C., subjected to grinding and then dealkalinized.

The combination was obtained by simple mixing.

EXAMPLE 4

A product suitable to be used for ornamental plasters to replace brick walls.

The following components were used:
- about 78.5% of an inert substance (a clay having a grain 1);
- about 21% of latex either of a sybthetic rubber or of an acrylonitrilic resin;
- about 0.2% of an antifoaming agent;
- about 0.1% of cellulose; and,
- about 0.1% of a plasticizing agent.

The clay was baked at temperatures ranging from 800° C. and 1,000° C. and then subjected to grinding.

The combination was obtained by simple mixing.

EXAMPLE 5

A product suitable to be used for plasters and coverings of humid surfaces.

The following components were used:
- about 78.5% of an inert substance;
- about 21% of acrylonitrilic resins;
- about 0.2% of an antifoaming agent;
- about 0.1% of cellulose; and,
- about 0.1% of a plasticizing agent.

The clay was baked at temperatures ranging from 800° C. and 1,000° C. and then subjected to grinding. Prior to application 31% of cement by weight of the above-mentioned mortar is added thereto.

EXAMPLE 6

A product suitable to be used for the first layer of a paving exposed to the atmospheric agents.

The following components were used:
- about 78.5% of an inert substance (a clay having a grain 0);
- about 21% of a vinyl-acrylic copolymer in emulsion;
- about 0.2% of an antifoaming agent;
- about 0.1% of cellulose; and,
- about 0.1% of a plasticizing agent.

The process was the same as for example 1.

EXAMPLE 7

A permeable and filtering product suitable to be used for the paving of tennis courts.

The following components were used:
- about 81% of an inert substance (a clay having a grain 6);
- about 18% of latex of acrylic or acrylonitrilic resins or of a natural rubber;
- about 0.2% of an antifoaming agent;
- about 0.1% of cellulose; and,
- about 0.1% of a plasticizing agent.

The latex was beaten stiff by means of a mechanical device (time 1–5 minutes) and the foam obtained was mixed with the clay baked at about 800° C. and ground, the antifoaming agent, the cellulose and the plasticizing agent.

On humid grounds a quantity of a vinyl-acrylic copolymer in emulsion equal to half the percentage by weight of the latex should be mixed to the latex prior to the beating thereof.

The mortar can be made more permeable by decreasing the percentage of the latex and the antifoaming agent which could also be eliminated.

It should be noted that the percentages given in the examples are only indicative and they can vary, even in a wide range, also according to the climatic characteristics of the places where the mortars according to the invention are used.

Furthermore, it is evident that the above-mentioned examples should not be intended in a limiting sense and, accordingly, various combinations can be obtained.

As described above, the inert substance can be baked at various temperatures according to the hardness and color desired, subjected to grinding and used in a wide range of grains.

It should also be evident that in the practice a number of products can be used and, for example, it is possible to use a first waterproof layer and a second layer having higher permeability.

What is claimed is:

1. A paving material comprising at least about 75% clay as an inert ground substance, the remainder consisting essentially of an acrylic latex emulsion wherein the clay has been baked at a temperature ranging from 600° C. to 1400° C. and ground to a desire grain size.

2. The material of claim 1 wherein said acrylic latex emulsion includes less than about 10% or less of an anti-foaming agent.

3. The material of claim 1 wherein said acrylic latex emulsion includes about 1% or less cellulose as a sediment-preventing agent.

4. The material of claim 1 wherein the acrylic latex emulsion includes about 10% or less of a plasticizing agent.

5. The material of claim 1 wherein the acrylic latex emulsion includes about 1% or less of one or more of an anti-foaming agent, cellulose as a sediment-preventing agent and a plasticizing agent.

6. A process for obtaining a paving composition which comprises at least about 75% clay as an inert ground material, which clay has been baked at a temperature between 600° C. and 1400° C., and grinding the baked clay before mixing the clay with the acrylic latex emulsion the remainder consisting essentially of an acrylic latex emulsion, comprising beating the acrylic latex emulsion stiff to produce a foam, mixing the foam obtained with the clay.

7. The process of claim 6 including adding about 1% or less of one or more of an anti-foaming agent, a plasticizing agent and cellulose to said acrylic latex emulsion before mixing the emulsion with the clay.

* * * * *